United States Patent [19]

Beachel

[11] Patent Number: 5,488,798
[45] Date of Patent: Feb. 6, 1996

[54] GROUND INSERTED FISHING ROD HOLDER

[76] Inventor: Mary J. Beachel, 333 Thirteenth St., Marion, Iowa 52302

[21] Appl. No.: 311,386

[22] Filed: Sep. 23, 1994

[51] Int. Cl.⁶ .................................................. A01K 97/10
[52] U.S. Cl. ........................................ 43/21.2; 248/530
[58] Field of Search ............................ 43/21.2; 211/70.8; 248/156, 530, 532, 545, 155.1, 423; D22/147

[56] References Cited

U.S. PATENT DOCUMENTS

| D. 345,409 | 3/1994 | Baynard | D22/147 |
|---|---|---|---|
| 1,132,158 | 3/1915 | Brewer et al. | 43/17 |
| 3,318,560 | 5/1967 | Garrette, Jr. et al. | 248/532 |
| 4,036,368 | 7/1977 | Munsch | 211/70.8 |
| 5,349,775 | 9/1994 | Mondares | 43/21.2 |

*Primary Examiner*—P. Austin Bradley
*Assistant Examiner*—Jeanne M. Elpel

[57] ABSTRACT

A holder for supporting a fishing rod at an inclined angle relative to a ground surface. The inventive device includes a stake member for piercing and engaging the ground surface. An adjustment assembly extends from the stake member and terminates in a pole engaging assembly against which the fishing pole can lean. A pair of laterally extending steps are secured to an upper end of the stake and can be utilized to force the stake into the ground surface.

7 Claims, 3 Drawing Sheets

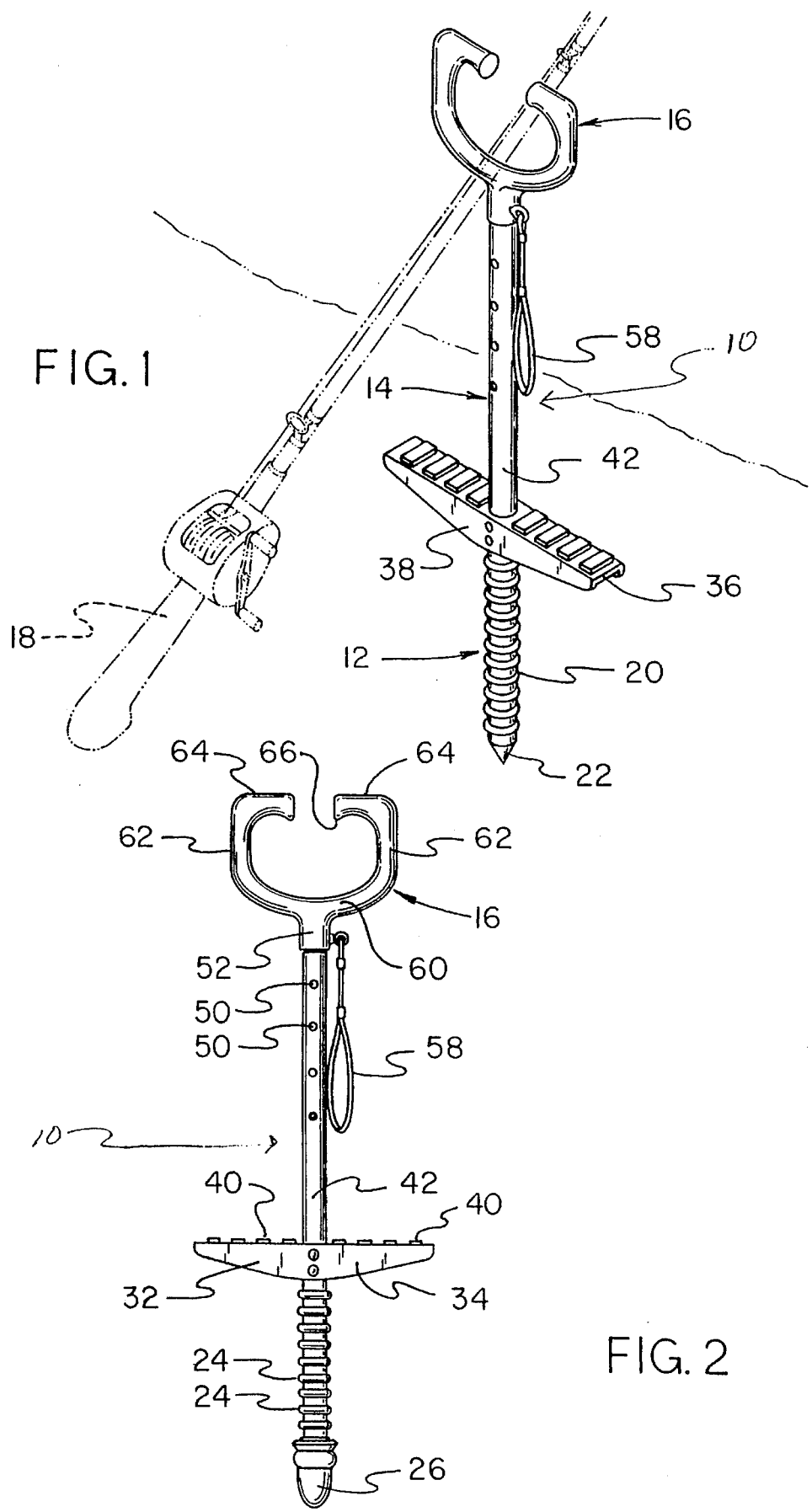

GROUND INSERTED FISHING ROD HOLDER

BACKGROUND OF THE INVENTION

1. Field of the Invention

The present invention relates to support structures and more particularly pertains to a ground inserted fishing rod holder for supporting a fishing pole at an inclined angle relative to a ground surface.

2. Description of the Prior Art

The use of support structures is known in the prior art. More specifically, support structures heretofore devised and utilized are known to consist basically of familiar, expected and obvious structural configurations, notwithstanding the myriad of designs encompassed by the crowded prior art which have been developed for the fulfillment of countless objectives and requirements.

Known prior art support structures include U.S. Pat. No. 5,187,892; U.S. Pat. No. 4,510,709; U.S. Pat. No. 3,115,722; U.S. Pat. No. 2,603,900; and U.S. Pat. No. 1,654,876.

While these devices fulfill their respective, particular objectives and requirements, the aforementioned patents do not disclose a ground inserted fishing rod holder for supporting a fishing rod at an inclined angle relative to a ground surface which includes a stake member for piercing and engaging the ground surface, an adjustment assembly extending from the stake member and terminating in a pole engaging assembly for supporting the fishing pole, and a pair of laterally extending steps secured to an upper end of the stake which may be utilized to force the stake into the ground surface.

In these respects, the ground inserted fishing rod holder according to the present invention substantially departs from the conventional concepts and designs of the prior art, and in so doing provides an apparatus primarily developed for the purpose of supporting a fishing rod at an inclined angle relative to a ground surface.

SUMMARY OF THE INVENTION

In view of the foregoing disadvantages inherent in the known types of support structures now present in the prior art, the present invention provides a new ground inserted fishing rod holder construction wherein the same can be utilized for supporting a fishing rod proximal to a body of water. As such, the general purpose of the present invention, which will be described subsequently in greater detail, is to provide a new ground inserted fishing rod holder apparatus and method which has many of the advantages of the support structures mentioned heretofore and many novel features that result in a ground inserted fishing rod holder which is not anticipated, rendered obvious, suggested, or even implied by any of the prior art support structures, either alone or in any combination thereof.

To attain this, the present invention generally comprises a holder for supporting a fishing rod at an inclined angle relative to a ground surface. The inventive device includes a stake member for piercing and engaging the ground surface. An adjustment assembly extends from the stake member and terminates in a pole engaging assembly against which the fishing pole can lean. A pair of laterally extending steps are secured to an upper end of the stake and can be utilized to force the stake into the ground surface.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new ground inserted fishing rod holder apparatus and method which has many of the advantages of the support structures mentioned heretofore and many novel features that result in a ground inserted fishing rod holder which is not anticipated, rendered obvious, suggested, or even implied by any of the prior art support structures, either alone or in any combination thereof.

It is another object of the present invention to provide a new ground inserted fishing rod holder which may be easily and efficiently manufactured and marketed.

It is a further object of the present invention to provide a new ground inserted fishing rod holder which is of a durable and reliable construction.

An even further object of the present invention is to provide a new ground inserted fishing rod holder which is susceptible of a low cost of manufacture with regard to both materials and labor, and which accordingly is then susceptible of low prices of sale to the consuming public, thereby making such ground inserted fishing rod holders economically available to the buying public.

Still yet another object of the present invention is to provide a new ground inserted fishing rod holder which provides in the apparatuses and methods of the prior art some of the advantages thereof, while simultaneously overcoming some of the disadvantages normally associated therewith.

Still another object of the present invention is to provide a new ground inserted fishing rod holder for supporting a fishing rod at an inclined angle relative to a ground surface.

Yet another object of the present invention is to provide a new ground inserted fishing rod holder which includes a stake member for piercing and engaging the ground surface, an adjustment assembly extending from the stake member and terminating in a pole engaging assembly for supporting the fishing pole, and a pair of laterally extending steps secured to an upper end of the stake which may be utilized to force the stake into the ground surface.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a ground inserted fishing rod holder according to the present invention in use.

FIG. 2 is a front elevation view of the device.

DESCRIPTION OF THE PREFERRED EMBODIMENT

Figure 3:
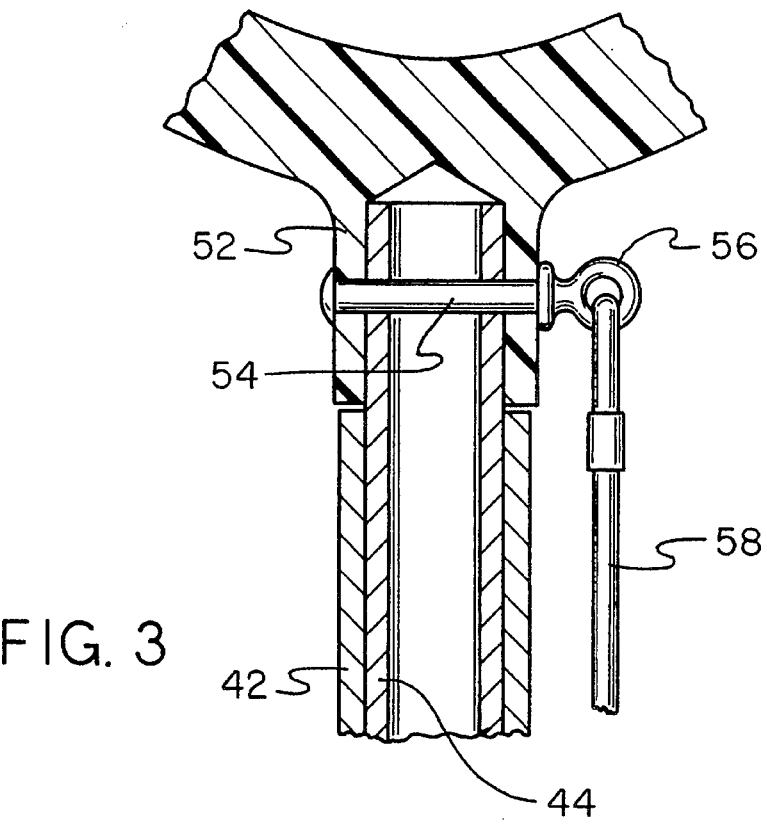
FIG. 3 is a cross-sectional view detailing an engagement of the pole engaging means to the adjustment means.
Figure 4:
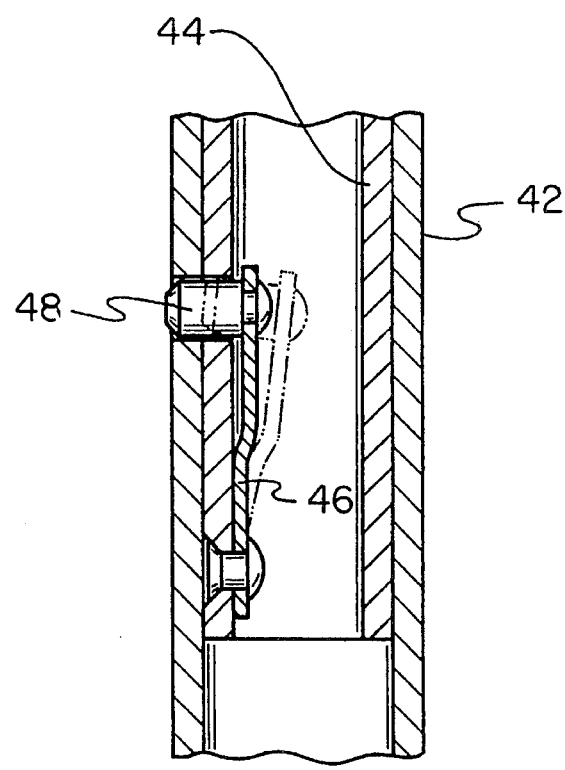
FIG. 4 is a further cross-sectional view of the present invention illustrating the adjustment means.

With reference now to the drawings, and in particular to FIGS. 1–6 thereof, a new ground inserted fishing rod holder embodying the principles and concepts of the present invention and generally designated by the reference numeral 10 will be described.

More specifically, it will be noted that the ground inserted fishing rod holder 10 comprises a stake means 12 for piercing and engaging a ground surface, as well as an adjustment means 14 extending upwardly from the stake means 12 for adjustably supporting a pole engaging means 16. The pole engaging means 16 is operable to engage and support a portion of a fishing pole 18 so as to support the fishing pole in an inclined orientation relative to the ground surface, as best illustrated in FIG. 1.

Figure 6:
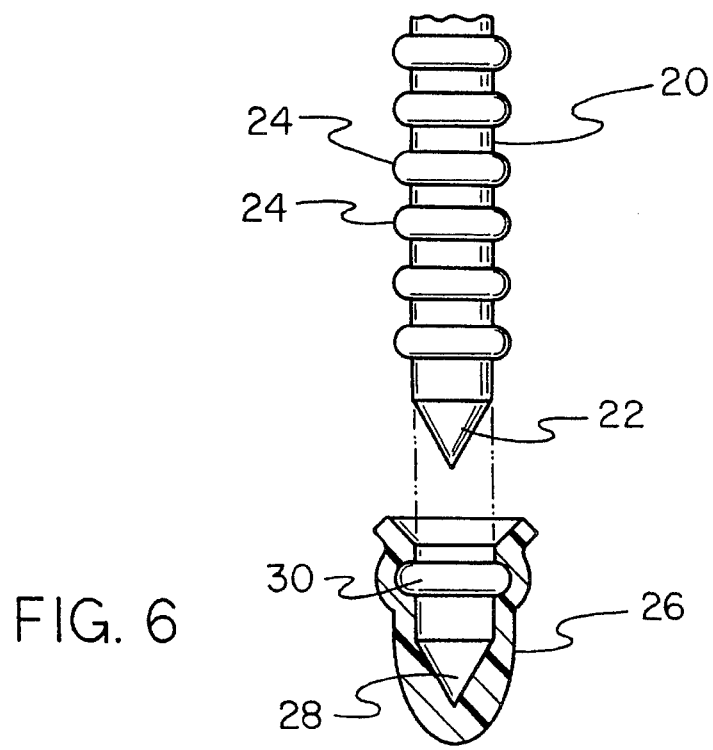
FIG. 6 is an enlarged side elevation view, partially in cross section, of a portion of the present invention.

Referring now to FIG. 2, with concurrent reference to FIG. 1, it can be shown that the stake means 12 comprises a stake member 20 of substantially elongated configuration. The stake member 20 terminates at a lower end thereof in a piercing tip 22 operable to pierce into the ground surface to which the device 10 is to be engaged. To retain the stake member 20 within the pierced ground surface, a plurality of annular rings 24 extend about the stake member 20 to preclude unintentional removal of the stake member from the ground surface. As shown in FIG. 6, a removable protective cap 26 can be engaged to the stake member 20 to cover the piercing tip 22 during transport and storage of the device 10 to preclude injury or damage to surrounding individuals or goods. To this end, the protective cap 26 is shaped so as to define a tip cavity 28 for receiving the piercing tip 22 of the stake member 20, and at least one annular cavity 30 to receive a lowermost one of the annular rings 24. By this structure, the protective cap 26 can be removably coupled and retained to the lower end of the stake member 20 to cover the piercing tip 22.

To facilitate a forced insertion of the stake member 20 of the stake means 12 into the ground surface, first and second lateral steps 32 and 34 are coupled to the stake member 20 proximal to an upper end thereof. The lateral steps 32, 34 are preferably integrally formed of a horizontally extending plate 36 having respectively opposed longitudinal edges, with at least one vertical plate 38 extending from one of the longitudinal edges of the horizontal plate 36. Preferably, the lateral steps 32, 34 comprise a pair of vertical plates 38 extending from the laterally opposed edges of the horizontal plate 36, with at least one fastener projecting through the vertical plates 38 in the stake member 20 to couple the lateral steps 32 and 34 thereto. By this structure, an individual may step onto the lateral steps 32, 34 to force the stake member 20 into the ground surface therebeneath. To preclude slipping of the individual's feet relative to the lateral steps 32, 34, each of the steps is provided with a plurality of grouping projections 40 along an upper surface of the horizontal plate 36.

Figure 5:
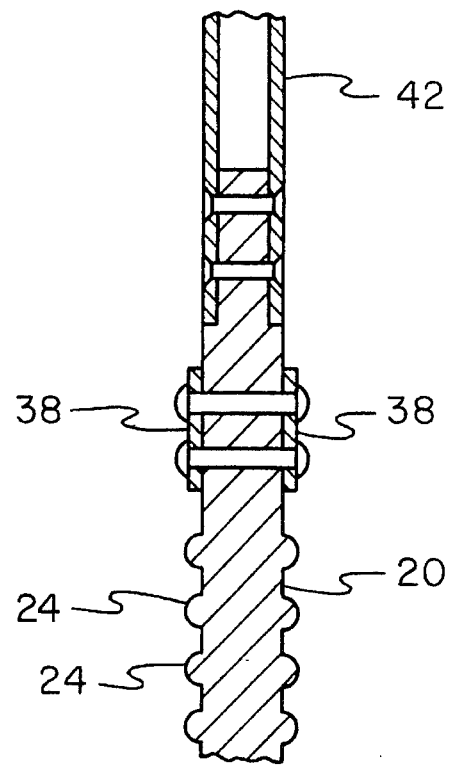
FIG. 5 is a cross-sectional view of the coupling of the stake member to the exterior tube of the adjustment means.

The adjustment means 14 extends upwardly from the stake means 12 and comprises an exterior tube 42 coupled to the uppermost end of the stake member 20 by a further plurality of fasteners, such as rivets or the like which extend through the exterior tube and the stake member, as illustrated in FIG. 5. Further, an interior tube 44 having an outside diameter smaller than an inside diameter of the exterior tube 42 is telescopingly received within the exterior tube and may be extended therefrom. To secure the interior tube 44 in a desired position relative to the exterior tube 42, a spring arm 46 mounted within the interior tube 44 includes a projection 48 which extends through an unlabelled aperture in the interior tube 44 and through any one of a plurality of adjustment apertures 50 extending through the exterior tube 42. By this structure, the projection 48 may be biased into the interior of the interior tube 44, whereby a sliding movement of the interior tube relative to the exterior tube 42 can be accomplished to position the interior tube at a desired height, whereby the projection 48 will be biased into another adjustment aperture 50 to secure such position.

Regardless of the specific adjustment aperture 50 to which the projection 48 is engaged, the interior tube 44 projects beyond the exterior tube 42 and engages a mounting boss 52 forming a portion of the pole engaging means 16. To this end, a mounting boss rivet 54 is directed through both the mounting boss 52 and the uppermost end of the interior tube 44, as shown in FIG. 3. Further, the mounting boss rivet 54 includes an eye 56 to which a carrying strap 58 is attached. The carrying strap 58 includes an unlabelled loop through which an individual's wrist may be extended to effect carrying of the device 10. Alternatively, the carrying strap 58 may be utilized to hang the device 10 during storage or transport thereof.

As best illustrated in FIG. 2, the pole engaging means 16 comprises the mounting boss 52 to which an arcuate transverse member 60 is integrally or otherwise fixedly secured. The transverse member 60 includes a pair of spaced ends, with a pair of vertical stanchions 62 each extending from an individual end of the transverse member. The vertical stanchions 62 extend upwardly from the transverse member 60 in a substantially parallel, spaced relationship and continue into inwardly projecting handle portions 64. The handle portions 64 are orthogonally oriented relative to the vertical stanchions 62 so as to project into a spaced and substantially parallel relationship relative to the transverse member 60. Each of the handle portions 64 terminates in a depending lip 66, with the depending lips being spaced a distance apart sufficient to allow placement of a fishing pole 18 therebetween and into the pole engaging means 16 so as to reside against the transverse member 60 thereof. By this structure, the pole engaging means 16 retains the fishing pole 18 relative to the upper end of the interior tube 44 to support the fishing pole at an inclined angle relative to the ground surface. Further, the handle portions 64 of the pole engaging means 16 can be utilized by an individual to carry the device 10 during transportation thereof, with the handle portions being further operable to receive a downward force from the hand or hands of an individual during insertion of the device 10 into the ground surface in lieu of, or in addition to, the force placed on the lateral steps 32 and 34 as described above.

In use, the ground inserted fishing rod holder 10 may be easily inserted into the ground surface proximal to a body of water. The fishing pole 18 can then be engaged to the device 10 as illustrated in FIG. 1, thereby allowing the fisherman to leave the fishing pole unattended to operate other fishing poles or equipment.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed as being new and desired to be protected by LETTERS PATENT of the United States is as follows:

1. A ground inserted fishing pole holder comprising:
    a stake means for piercing and engaging a ground surface, said stake means comprises a stake member of substantially elongated configuration, said stake member terminating at a lower end thereof in a piercing tip operable to pierce into said ground surface;
    a plurality of annular rings extending about said stake member to preclude unintentional removal of said stake member from said ground surface;
    a pole engaging means for engaging and supporting a portion of a fishing pole; and
    an adjustment means extending upwardly from said stake means for adjustably supporting said pole engaging means relative to said stake means.

2. The ground inserted fishing pole holder of claim 1, and further comprising first and second lateral steps coupled to said stake member proximal to an upper end thereof.

3. The ground inserted fishing pole holder of claim 2, wherein said lateral steps are formed of a horizontally extending plate having respectively opposed longitudinal edges, with at least one vertical plate extending from one of said longitudinal edges of said horizontal plate.

4. The ground inserted fishing pole holder of claim 3, wherein said adjustment means comprises an exterior tube coupled to an uppermost end of said stake member; and an interior tube having an outside diameter smaller than an inside diameter of said exterior tube telescopingly received within said exterior tube; a spring arm mounted within interior tube and including a projection which extends through an aperture in said interior tube and through any one of a plurality of adjustment apertures extending through said exterior tube, wherein said projection can be biased into an interior of said interior tube to permit a sliding movement of said interior tube relative to said exterior tube, whereby said projection can be biased into another adjustment aperture to secure said interior tube relative to said exterior tube.

5. The ground inserted fishing pole holder of claim 4, wherein said pole engaging means comprises a mounting boss coupled to an upper end of said interior tube; an arcuate transverse member fixedly secured to said mounting boss, said transverse member including a pair of spaced ends; a pair of vertical stanchions each extending from an individual one of said ends of said transverse member, said vertical stanchions extending upwardly from said transverse member in a substantially parallel, spaced relationship and continuing into inwardly projecting handle portions, said handle portions being orthogonally oriented relative to said vertical stanchions so as to project into a spaced and substantially parallel relationship relative to said transverse member, said handle portions each terminating in a depending lip, with said depending lips being spaced a distance apart sufficient to allow placement of said fishing pole therebetween and into said pole engaging means so as to reside against said transverse member thereof.

6. The ground inserted fishing pole holder of claim 5, and further comprising a removable protective cap engaged to said stake member to cover said piercing tip during transport and storage of said holder, said protective cap being shaped so as to define a tip cavity for receiving said piercing tip of said stake member, and at least one annular cavity to receive a lowermost one of said annular rings.

7. A ground inserted fishing pole holder comprising:
    a stake means for piercing and engaging a ground surface, said stake means comprising a stake member of substantially elongated configuration, said stake member terminating at a lower end thereof in a piercing tip operable to pierce into said ground surface; and a plurality of annular rings extending about said stake member to preclude unintentional removal of said stake member from said ground surface;
    first and second lateral steps coupled to said stake member proximal to an upper end thereof, said lateral steps being formed of a horizontally extending plate having respectively opposed longitudinal edges, with at least one vertical plate extending from one of said longitudinal edges of said horizontal plate;
    a removable protective cap engaged to said stake member to cover said piercing tip during transport and storage of said holder, said protective cap being shaped so as to define a tip cavity for receiving said piercing tip of said stake member, and at least one annular cavity to receive a lowermost one of said annular rings;
    a pole engaging means for engaging and supporting a portion of a fishing pole, said pole engaging means comprises a mounting boss; an arcuate transverse member fixedly secured to said mounting boss, said transverse member including a pair of spaced ends; a pair of vertical stanchions each extending from an individual one of said ends of said transverse member, said vertical stanchions extending upwardly from said transverse member in a substantially parallel, spaced relationship and continuing into inwardly projecting handle portions, said handle portions being orthogonally oriented relative to said vertical stanchions so as to project into a spaced and substantially parallel relationship relative to said transverse member, said handle portions each terminating in a depending lip, with said depending lips being spaced a distance apart sufficient to allow placement of said fishing pole therebetween and into said pole engaging means so as to reside against said transverse member thereof;
    a carrying strap coupled to said holder, said carrying strap including a loop through which an individual's wrist can be extended to effect carrying of said holder; and,
    an adjustment means extending upwardly from said stake means for adjustably supporting said pole engaging means relative to said stake means, said adjustment means comprising an exterior tube coupled to an uppermost end of said stake member; and an interior tube having an outside diameter smaller than an inside diameter of said exterior tube telescopingly received within said exterior tube; a spring arm mounted within said interior tube and including a projection which extends through an aperture in said interior tube and through any one of a plurality of adjustment apertures extending through said exterior tube, wherein said projection can be biased into an interior of said interior tube to permit a sliding movement of said interior tube relative to said exterior tube, whereby said projection can be biased into another adjustment aperture to secure said interior tube relative to said exterior tube.

* * * * *